United States Patent
Parupati et al.

(10) Patent No.: US 11,170,242 B2
(45) Date of Patent: Nov. 9, 2021

(54) SPOOF DETECTION USING DUAL-BAND FLUORESCENCE

(71) Applicant: Advanced New Technologies Co., Ltd., Grand Cayman (KY)

(72) Inventors: Srikanth Parupati, Framingham, MA (US); Reza R. Derakhshani, Shawnee, KS (US)

(73) Assignee: Advanced New Technologies Co., Ltd., Grand Cayman (KY)

(*) Notice: Subject to any disclaimer, the term of this patent is extended or adjusted under 35 U.S.C. 154(b) by 32 days.

(21) Appl. No.: 16/232,782

(22) Filed: Dec. 26, 2018

(65) Prior Publication Data

US 2020/0210738 A1    Jul. 2, 2020

(51) Int. Cl.
*G06K 9/00* (2006.01)

(52) U.S. Cl.
CPC ..... *G06K 9/00899* (2013.01); *G06K 9/00255* (2013.01); *G06K 9/00288* (2013.01)

(58) Field of Classification Search
CPC ........... G06K 9/00228; G06K 9/00255; G06K 9/00288; G06K 9/00604; G06K 9/00899; G06K 9/2018
See application file for complete search history.

(56) References Cited

U.S. PATENT DOCUMENTS

| | | | |
|---|---|---|---|
| 8,284,019 B2 * | 10/2012 | Pishva | G06K 9/0012 340/5.2 |
| 9,390,327 B2 | 7/2016 | Gottemukkula et al. | |
| 2002/0136435 A1 * | 9/2002 | Prokoski | G06K 9/00906 382/118 |
| 2004/0041997 A1 | 3/2004 | Uomori et al. | |
| 2004/0186363 A1 * | 9/2004 | Smit | A61B 5/0071 600/317 |
| 2005/0265585 A1 * | 12/2005 | Rowe | G06K 9/00046 382/124 |

(Continued)

OTHER PUBLICATIONS

Zeng et al. "Spectroscopic and microscopic characteristics of human skin autofluorescence emission." Photochemistry and photobiology 61.6 (1995): 639-645. (Year: 1995).*

(Continued)

*Primary Examiner* — Katrina R Fujita
(74) *Attorney, Agent, or Firm* — Fish & Richardson P.C.

(57) ABSTRACT

The technology described in this document can be embodied in a method for preventing access to a secure system based on determining that a subject is an alternative representation of a live person. The method includes illuminating a first subject with electromagnetic radiation using a first wavelength range that cause fluorescence in human tissue. The fluorescence is in a second wavelength range different from the first wavelength range. The method also includes receiving, responsive to illuminating the first subject and using one or more sensors, electromagnetic radiation emitted from the first subject, and determining that the received electromagnetic radiation is outside the second wavelength range. Responsive to determining that the received electromagnetic radiation is outside the second wavelength range, the method further includes identifying the first subject as an alternative representation of a live person, and preventing access to the secure system in response.

21 Claims, 4 Drawing Sheets

(56) References Cited

U.S. PATENT DOCUMENTS

| | | | |
|---|---|---|---|
| 2007/0004972 A1* | 1/2007 | Cole | A61B 5/0071 600/306 |
| 2008/0025579 A1 | 1/2008 | Sidlauskas et al. | |
| 2016/0267339 A1 | 9/2016 | Nakano et al. | |
| 2016/0335483 A1* | 11/2016 | Pfursich | H04W 12/0605 |
| 2016/0371555 A1 | 12/2016 | Derakhshani et al. | |
| 2017/0124374 A1 | 5/2017 | Rowe et al. | |
| 2017/0286788 A1 | 10/2017 | Fan et al. | |
| 2017/0323167 A1* | 11/2017 | Mapen | G06T 7/90 |
| 2017/0325721 A1 | 11/2017 | Matsuda et al. | |
| 2017/0344793 A1 | 11/2017 | Xue et al. | |
| 2018/0053044 A1 | 2/2018 | Su et al. | |
| 2018/0165512 A1 | 6/2018 | Fan | |
| 2018/0181794 A1 | 6/2018 | Benini et al. | |
| 2018/0247142 A1 | 8/2018 | Oda et al. | |
| 2018/0285668 A1 | 10/2018 | Li et al. | |
| 2018/0349721 A1 | 12/2018 | Agrawal et al. | |
| 2019/0025672 A1 | 1/2019 | Van Der Sijde et al. | |
| 2019/0068367 A1 | 2/2019 | Baughman et al. | |
| 2019/0147213 A1* | 5/2019 | Yeke Yazdandoost | G06K 9/00013 382/124 |
| 2019/0207932 A1* | 7/2019 | Bud | G06F 21/32 |
| 2019/0278974 A1* | 9/2019 | Lubin | G06K 9/00261 |
| 2019/0362120 A1* | 11/2019 | Yeke Yazdandoost | H01L 27/14629 |
| 2020/0104567 A1 | 4/2020 | Tajbakhsh et al. | |
| 2020/0134242 A1 | 4/2020 | Parupati et al. | |
| 2020/0134344 A1 | 4/2020 | Joshi et al. | |
| 2020/0134345 A1 | 4/2020 | Joshi et al. | |
| 2020/0250448 A1 | 8/2020 | Joshi et al. | |
| 2020/0293640 A1 | 9/2020 | Joshi et al. | |

OTHER PUBLICATIONS

Uzair et al. "Is spectral reflectance of the face a reliable biometric?." Optics express 23.12 (2015): 15160-15173. (Year: 2015).*

PCT International Search Report and Written Opinion in International Application No. PCT/US2019/058125, dated Feb. 5, 2020, 11 pages.

Sun et al., "TIR/VIS correlation for liveness detection in face recognition," 14th International Conference on Computer Analysis of Images and Patterns, Aug. 2011, 6855:114-121.

Zanuttigh et al., "Operating Principles of Structured Light Depth Cameras," Time-of-Flight and Structured Light Depth Cameras, Springer International Publishing, 2016, Chapter 2, DOI: 10.1007/978-3-319-30973-6_2, pp. 43-79.

U.S. Appl. No. 16/171,029, Joshi et al., filed Oct. 25, 2018.

* cited by examiner

SPOOF DETECTION USING DUAL-BAND FLUORESCENCE

TECHNICAL FIELD

This disclosure relates to image capture devices.

BACKGROUND

Systems incorporating a biometric identification technology such as face recognition or iris recognition often include a camera and one or more illuminators. The camera may include linear cross polarizes, and the one or more illuminators are used to illuminate a subject with different wavelengths of light.

SUMMARY

In one aspect, this document features a method for preventing access to a secure system based on determining that a subject is an alternative representation of a live person. The method includes illuminating a first subject with electromagnetic radiation using a first wavelength range that cause fluorescence in human tissue. The fluorescence is in a second wavelength range different from the first wavelength range. The method also includes receiving, responsive to illuminating the first subject and using one or more sensors, electromagnetic radiation emitted from the first subject, and determining that the received electromagnetic radiation is outside the second wavelength range. Responsive to determining that the received electromagnetic radiation is outside the second wavelength range, the method further includes identifying the first subject as an alternative representation of a live person, and preventing access to the secure system in response.

In another aspect, this document features a system that includes one or more illumination sources, one or more image acquisition devices, and one or more processing devices. The one or more illumination sources illuminate a first subject with electromagnetic radiation using a first wavelength range that cause fluorescence in human tissue, the fluorescence being in a second wavelength range different from the first wavelength range. The one or more image acquisition devices receive, using one or more sensors and responsive to illuminating the first subject, electromagnetic radiation emitted from the first subject. The one or more processing devices are programmed to determine that the received electromagnetic radiation is outside the second wavelength range, identify the first subject as an alternative representation of a live person accordingly, and prevent access to a secure system responsive to identifying the first subject as an alternative representation of a live person.

In another aspect, this document features one or more machine-readable storage devices encoded with instructions that cause one or more processing devices to execute various operations. The operations include illuminating a first subject with electromagnetic radiation using a first wavelength range that cause fluorescence in human tissue, the fluorescence being in a second wavelength range different from the first wavelength range, and responsive to illuminating the first subject, receiving, from one or more sensors, signal representing electromagnetic radiation captured from the first subject. The operations also include determining that the captured electromagnetic radiation is outside the second wavelength range, and in response, identifying the first subject as an alternative representation of a live person. The operations further include preventing access to the secure system responsive to identifying the first subject as an alternative representation of a live person.

Implementations of the above aspects can include one or more of the following features. A determination may be made that at least a portion of electromagnetic radiation received from a second subject is in the second wavelength range, identifying, in response, the second subject as a live person, and responsive to identifying the second subject as a live person, initiating an authentication process for determining whether the live person is authorized to access the secure system. The first wavelength range can include 360 nm, and the second wavelength range can include 460 nm. The first wavelength range can include 405 nm, and the second wavelength range can include 500 nm. The electromagnetic radiation in the first wavelength range can be radiated from one or more cross-polarized illuminators, and the electromagnetic radiation emitted from the first subject can be received using one or more corresponding cross polarizers. The alternative representation of a live person can include a photograph of a live person or a mask depicting a live person. The secure system can include a user-interface disposed in a kiosk. Receiving the electromagnetic radiation emitted from the first subject can include receiving the electromagnetic radiation at the one or more sensors within a predetermined time from an onset of the electromagnetic radiation of the first wavelength range.

Repeat use of reference characters in the present specification and drawings is intended to represent same or analogous features or elements.

DETAILED DESCRIPTION

This document presents an image analysis method in which an image captured using an image acquisition device of a biometric authentication system is analyzed to determine if the image corresponds to an actual live person, or to an alternative representation of the live person Such alternative representations can include, for example, a photograph or another image of the live person printed on paper, or displayed on a high definition display device, a mask that is designed as a representation of a person, or a robotic representation of a person. Specifically, the technology described herein leverages a spectral analysis method that analyzes fluorescence that is reemitted from a subject attempting to use a biometric authentication system, after the subject is illuminated with electromagnetic radiation of particular wavelength ranges. The reemitted light is analyzed to determine whether the subject is an actual live person, or an alternative representation of a person. The human tissue of a live subject exhibit the phenomenon of fluorescence when illuminated with electromagnetic radiation of specific wavelength ranges (e.g. near ultraviolet (UV)

light of around 360 nm and/or 405 nm wavelength). When illuminated with electromagnetic radiation at these wavelengths, the live tissues absorbs such radiation and reemits portions of the absorbed radiation at other wavelengths. In other words, the live tissue fluoresces when excited with radiation of appropriate wavelengths. This can also be referred to as the fluorescence signature of the On the other hand, spoof materials such as paper, masks etc. do not fluoresce when illuminated with the same wavelengths. These differences in fluorescence signatures of live tissues and other materials can be leveraged to differentiate between live human subjects and spoof alternative representations.

If the subject attempting to access a biometric authentication system is not determined to be a live person, further operations of the biometric authentication system can be reduced or stopped, and any corresponding access attempt can be prevented immediately. Many biometric authentication systems involve authenticating a user to a secure system based on recognizing the user's face, eye-print, iris etc. Such biometric authentication systems involve capturing one or more images of a user, and executing corresponding recognition processes on the captured image. Malicious attempts to breach the security of the biometric authentication system may include presenting an alternative representation of a live person to gain access to an account or other privileges associated with the identity of the corresponding live person. The technology described herein improves security/reliability of biometric authentication systems that rely on recognizing a user based on face recognition, eye-print recognition, iris recognition etc. The spectral analysis method is a low cost method that may be used to distinguish a subject that is wearing a mask that is designed to represent a live person, or a robotic representation of the person, from the live person. When the biometric system determines that the subject is an alternative representation of a live person (also referred to as a spoof) the subject is not allowed access to the secure system, thereby adding an additional layer of security to the system.

Figure 1:
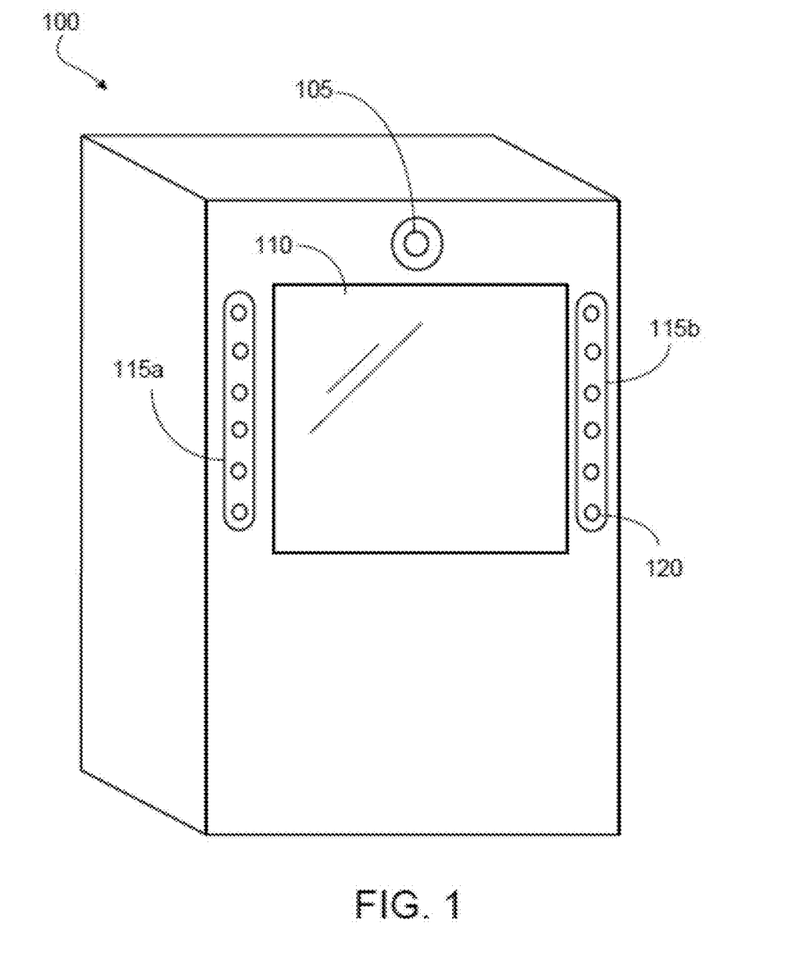
FIG. 1 shows a kiosk machine as an example environment in which the technology described herein may be used.

FIG. 1 shows a kiosk machine 100 as an example environment in which the technology described herein may be used. Such kiosk machines may be used for various purposes that require authenticating users via one or more biometric authentication processes. For example, the kiosk 100 can include an automated teller machine (ATM) that allows a user to withdraw money from a bank account. In another example, the kiosk 100 may be deployed at a restaurant or a fast-food outlet, and allow a user to order and pay for food. The kiosk 100 may also be deployed at an entry point (e.g., at the gate of an arena or stadium) to authenticate entrants prior to entering the venue. In general, the kiosk 100 may be deployed at various types of locations to authenticate users interactively, or even without any active participation of the user.

In some implementations, the kiosk 100 can include one or more components that support a biometric authentication system. For example, the kiosk 100 can include an image acquisition device 105 that captures images of users interacting with the kiosk 100. The captured images may be processed to identify/authenticate valid users, and/or permit or deny access to the services/products being offered through the kiosk. For example, the kiosk 100 may include a display device 110 (e.g., a capacitive touch screen) that allows a user to select and order food at a retail outlet. Once the user completes the selection via user-interfaces presented on the display device 110, the user may be asked to look towards the image acquisition devices 105 for authentication. The images captured using the image acquisition device 105 may then be used to authenticate/identify/verify a pre-stored profile for the user, and the payment for the food may then be automatically deducted from an account linked to the profile. In some implementations, the kiosk may simultaneously confirm an authentication based on performing a spectral analysis on the subject to determine whether the subject is a live person or an alternative representation of a person.

The image acquisition device 105 can be of various types. In some implementations, the image acquisition device 105 is a camera/senor configured to capture an image of the subject. In some implementations, the image acquisition device 105 is a camera that includes one or more linear cross-polarizers. The one or more linear cross-polarizers are configured to receive light in particular polarization states. In some implementations, the image acquisition device 105 can be a depth sensing camera that captures images of subjects illuminated by IR or near IR wavelengths.

In some implementations, the images captured using the image acquisition devices 105 can be processed using an underlying biometric authentication system to identify/verify the user. In some implementations, the biometric authentication system may extract from the images, various features—such as features derived from the face, iris, vasculature underlying the sclera of the eye, or the periocular region—to identify/authenticate a particular user based on matching the extracted features to that of one or more template images stored for the user during an enrollment process. The biometric authentication system may also perform a spectral analysis on the subject by illuminating the subject with near UV light (or electromagnetic radiation of other wavelength ranges that cause fluorescence) and analyzing the response of the spectral response of the subject. The biometric authentication system may use a machine-learning process (e.g., a deep learning process implemented, for example, using a deep neural network architecture) to match the user to one of the many templates stored for various users of the system. In some implementations, the machine learning process may be implemented, at least in part, using one or more processing devices deployed on the kiosk 100. In some implementations, the kiosk 100 may communicate with one or more remote processing devices (e.g., one or more remote servers) that implement the machine learning process.

In some implementations, the images captured using the image acquisition device 105 are used to authenticate/identify/verify a user, and provide access to accounts/privileges associated with the identity of the user. For example, one or more images captured by the image acquisition devices 105 can be analyzed to recognize a user (e.g., using face recognition, eye-print recognition, iris recognition etc.) using a corresponding underlying biometric authentication process. However, malicious attempts to breach the security of such biometric authentication processes often involve presentation of an alternative representation of a live person (e.g., photograph or other image of the live person printed on paper, or displayed on a high definition display device) in an attempt to cause the underlying biometric authentication system to identify the alternative representation as the corresponding live person. Therefore, in many cases, the security and/or reliability of the underlying biometric authentication system depends on the ability of the system to discriminate between actual live persons and spoof alternative representations such as printed photographs or images displayed on display devices. The technology described herein allows for improving the discrimination capabilities of biometric authentication systems, thereby improving reliability/security of the systems.

In some implementations, the kiosk 100 can include one or more illumination sources 115a and 115b (115, in general) configured to generate the electromagnetic radiation for illuminating the subject at the kiosk 100. In some examples, the kiosk 100 includes one illumination source that is configured to generate near UV light at a 360 nm wavelength range, and one illumination source that is configured to generate electromagnetic radiation at a 405 nm wavelength range. In some implementations, the one or more illumination sources 115a and 115b can each include a light array that includes one or more light sources (e.g., light emitting diodes (LEDs)). In some implementations, the one or more illumination sources 115a and 115b each includes one or more cross-polarizers to produce polarized illumination. While the example in FIG. 1 shows two illumination sources 115 that are physically separated along a horizontal direction, more or fewer illumination sources 115 may also be used. Also, while the example in FIG. 1 shows a kiosk 100, the technology described herein can be used in other devices. For example, the spoof detection technology described herein can also be implemented in a mobile device such as a mobile phone, or a tablet device.

Figure 2A:
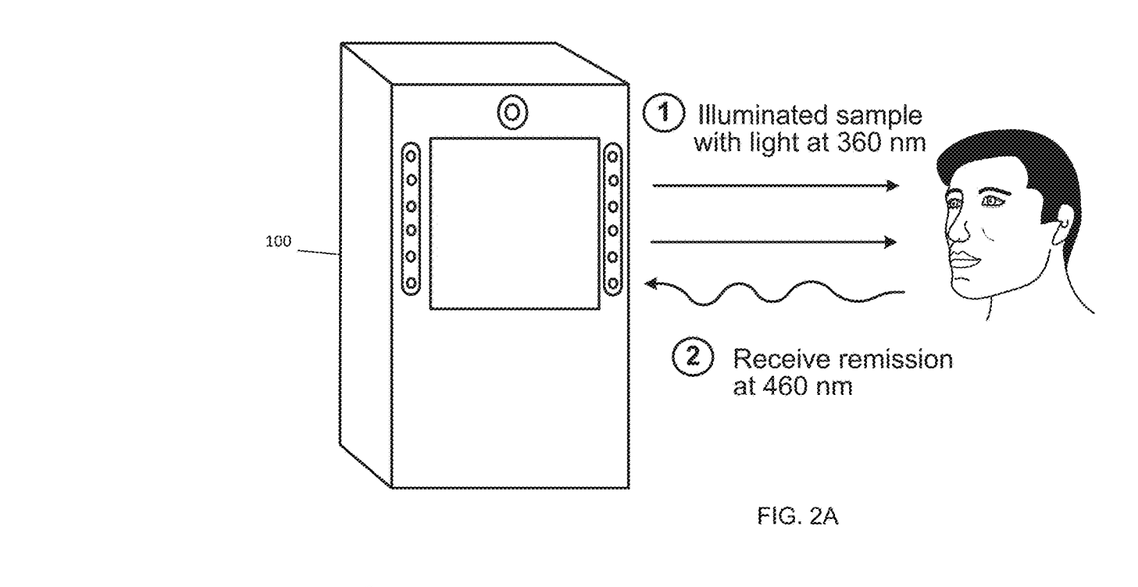
FIG. 2A shows an example of a live subject reemitting light when illuminated with light at 360 nm.
Figure 2B:
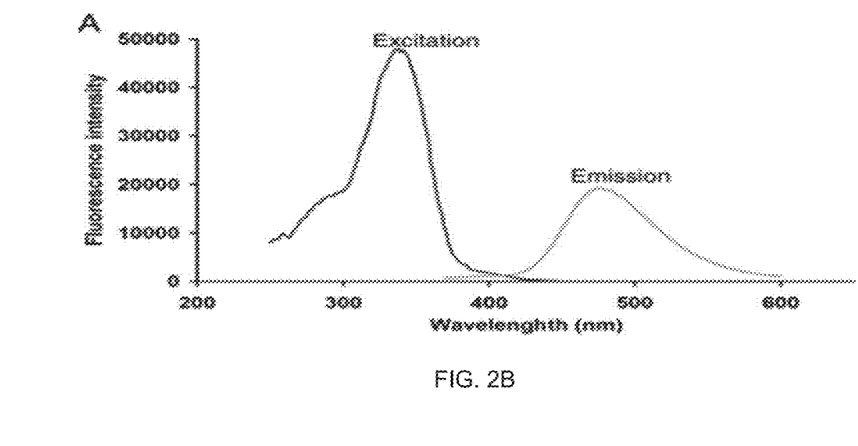
FIG. 2B shows a plot illustrating fluorescence from a live subject when illuminated with electromagnetic radiation of as shown in FIG. 2A.

FIG. 2A shows an example of a live subject being illuminated with near UV light at 360 nm. As seen in FIG. 2a, when a subject is present at the kiosk 100, the one or more illumination sources 115a and 115b illuminate the subject with near UV light at 360 nm. In some implementations, one illumination source 115a is configured to illuminate the subject with 360 nm light for a first period of time. When the near UV light at about 360 nm illuminates the live human tissue of a live subject, the tissue of the subject absorbs the electromagnetic radiation and reemits radiation at a wavelength of about 460 nm. In other words, the human tissue fluoresces when excited with light at about 360 nm. FIG. 2B shows a plot illustrating fluorescence from a live subject when illuminated with electromagnetic radiation of as shown in FIG. 2A. As illustrated in FIG. 2B, which illustrates an example spectral response for a case where the live subject is illuminated with light at 360 nm, the fluorescence or reemission of light from the subject peaks at about 460 nm.

In some implementations, the fluorescence reemission is captured using an image acquisition device 105 within a predetermined time from the onset of the illumination. In some cases, capturing the fluorescence within such a predetermined time can make the measurements more accurate and potentially prevent replay attacks (in which an image/video of fluorescence is presented as part of a malicious attempt to gain access to the underlying secure system). Attempting to capture the fluorescence during a certain period of time after onset of the illumination adds a temporal aspect to the captured fluorescence, which in turn can add another layer of security, and potentially improve the robustness of the system against malicious spoof attacks.

Other wavelengths/wavelength ranges may also be used for detecting fluorescence from live tissues. In some implementations, the one or more illumination sources 115 is configured to illuminate the subject with electromagnetic radiation of about 405 nm. When electromagnetic radiation at 405 nm illuminates human tissues of a live subject, the tissue fluoresces, and reemits light at a wavelength of about 500 nm. In some implementations, the one or more illumination sources 115a and 115b simultaneously illuminate the subject with electromagnetic radiation at 360 nm and 405 nm, respectively. When the subject is simultaneously illuminated with light at 360 nm and 405 nm, the live tissue fluoresces at 460 nm and 500 nm simultaneously. On the other hand, when electromagnetic radiation of about 360 nm and about 405 nm illuminates a an alternative representation of a person (e.g. a photograph or other image of a live person printed on paper, a mask that is designed as a representation of a person, or a robotic representation of a person), the subject does not fluoresce. For example, if a subject is wearing a mask to impersonate another person, or a printed photograph of another person is presented to gain access to the underlying secure system, the mask or the paper does not exhibit fluorescence. This difference in the response from that of live tissue can be used to determine whether the subject is a live person, or a spoof alternative representation of a live person.

In some implementations, cross-polarized illumination and cross-polarized hardware/camera can be used together in order to amplify the unique spectral signatures based on specular and diffuse fluorescence reflections of materials. For example, two separate illumination sources 115a and 115b can be cross-polarized to generate illumination such that the corresponding polarization states are orthogonal to one another. When such illumination is absorbed and then reemitted from the tissue, the polarization states can be altered. For example, portions of human tissue (e.g. forehead, nose) may reemit light with horizontal polarization (also referred to as specular emission), and portions of human tissue (e.g. cheeks) may reemit light with vertical polarization (also referred to as diffusion). When a human subject is illuminated with electromagnetic radiation, portions of the subject's face such as cheeks, forehead and nose areas are expected to emit specular emission, and portions of the subject's face such as the sides are expected to emit diffusion. Synchronized hardware at the image acquisition device 105 can be used to capture the reemitted fluorescence to augment the process of differentiating between live humans and spoof alternative representations. For example, linear polarizers at the front end of the image acquisition devices 105 can be used to improve the specular and diffusion emissions from a human face. In some implementations, the image acquisition device 105 with RGB sensors and linear cross polarizers first capture the green and blue color channels to obtain an image of the subject under the global ambient illumination. Such an image can be used, for example, to identify the regions from where specular or diffusion emissions are expected. The illumination sources 115 can then illuminate the subject with different bands of near-UV (e.g., a wavelength range including 360 nm) and blue light (e.g., a wavelength range including 405 nm) to measure fluorescence under the dual polarization, as described above.

Figure 3:
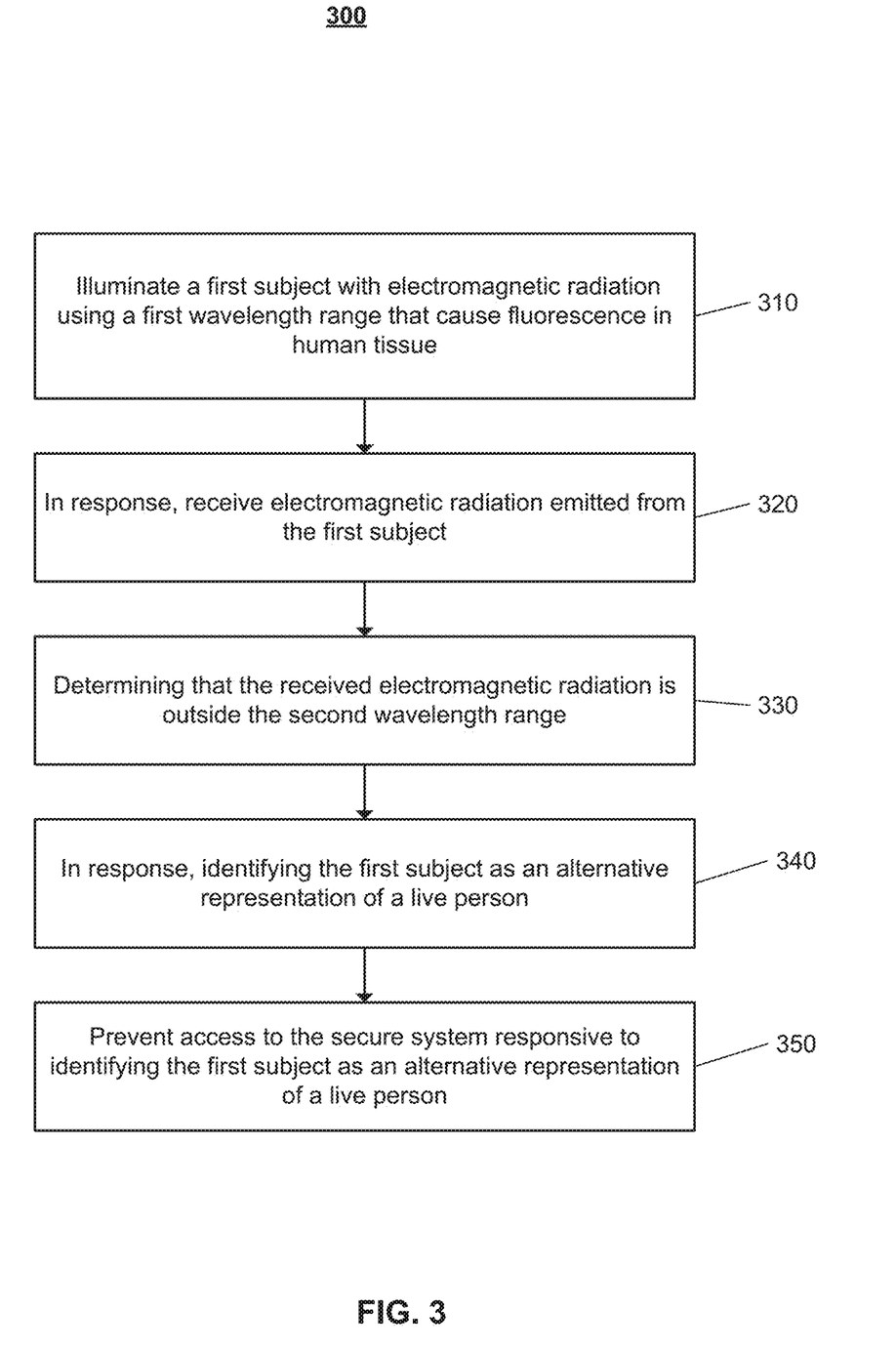
FIG. 3 is a flowchart of an example process for preventing access to a secure system based on determining the subject is an alternative representation of a live person.

FIG. 3 is a flowchart of an example process 300 for preventing access to a secure system based on determining the subject is an alternative representation of a live person. In some implementations, at least a portion of the process 300 may be executed by one or more processing devices disposed within a kiosk such as the kiosk 100 described with reference to FIG. 1. In some implementations, at least a portion of the process 300 may be executed at one or more servers (such as servers or computing devices in a distributed computing system) in communication with remote components such as one or more processing devices disposed within a kiosk. Operations of the process 300 includes illuminating a first subject with electromagnetic radiation using a first wavelength range that cause fluorescence in human tissue (310). The fluorescence includes emissions in a second wavelength range different from the first wavelength range. For example, the first wavelength range can include radiations in at around 360 nm, which when absorbed and reemitted by human tissue, is reemitted at around 460 nm. In another example, the first wavelength range can include radiations in at around 405 nm, which when absorbed and reemitted by human tissue, is reemitted at around 500 nm. In some implementations, the electromagnetic radiation in the first wavelength range is radiated from one or more cross-polarized illuminators.

Operations of the process 300 also includes receiving using one or more sensors, responsive to illuminating the first subject, electromagnetic radiation emitted from the first subject. In some implementations, if cross-polarized illuminators are used to radiate the electromagnetic energy in the first wavelength range, the electromagnetic radiation emitted from the first subject can be received through one or more corresponding cross polarizers. The electromagnetic radiation at the one or more sensors can be received within a predetermined time from an onset of the electromagnetic radiation of the first wavelength range. For example, the predetermined time can represent an expected time for a human tissue to absorb and reemit incident radiation.

Operations of the process 300 can also include determining that the received electromagnetic radiation is outside the second wavelength range (330), and in response, identifying the first subject as an alternative representation of a live person (340). The alternative representation of the live person can include a photograph of a live person, or a mask depicting a live person. Responsive to identifying the first subject as an alternative representation of a live person, the process 300 can include preventing access to the secure system (350). The secure system can include a user-interface disposed in a kiosk, such as the kiosk 100 described in FIG. 1.

The process 300 can also include determining that at least a portion of electromagnetic radiation received from a second subject is in the second wavelength range, and in response, identifying the second subject as a live person. When the subject is identified as a live person, an authentication process can be initiated to determine whether the live person is authorized to access the secure system, and the liver person can be allowed to access the secure system based on an output of the secure system. The authentication process can include a biometric authentication process that is based on, for example, iris identification, face identification, or eye print identification. The foregoing process can therefore serve as a pre-processing step in biometric authentication to eliminate spoof representations quickly, such that the time and computing resources spent on processing such spoofs can be reduced. The technology described herein therefore can make an underlying biometric authentication process more efficient.

Figure 4:
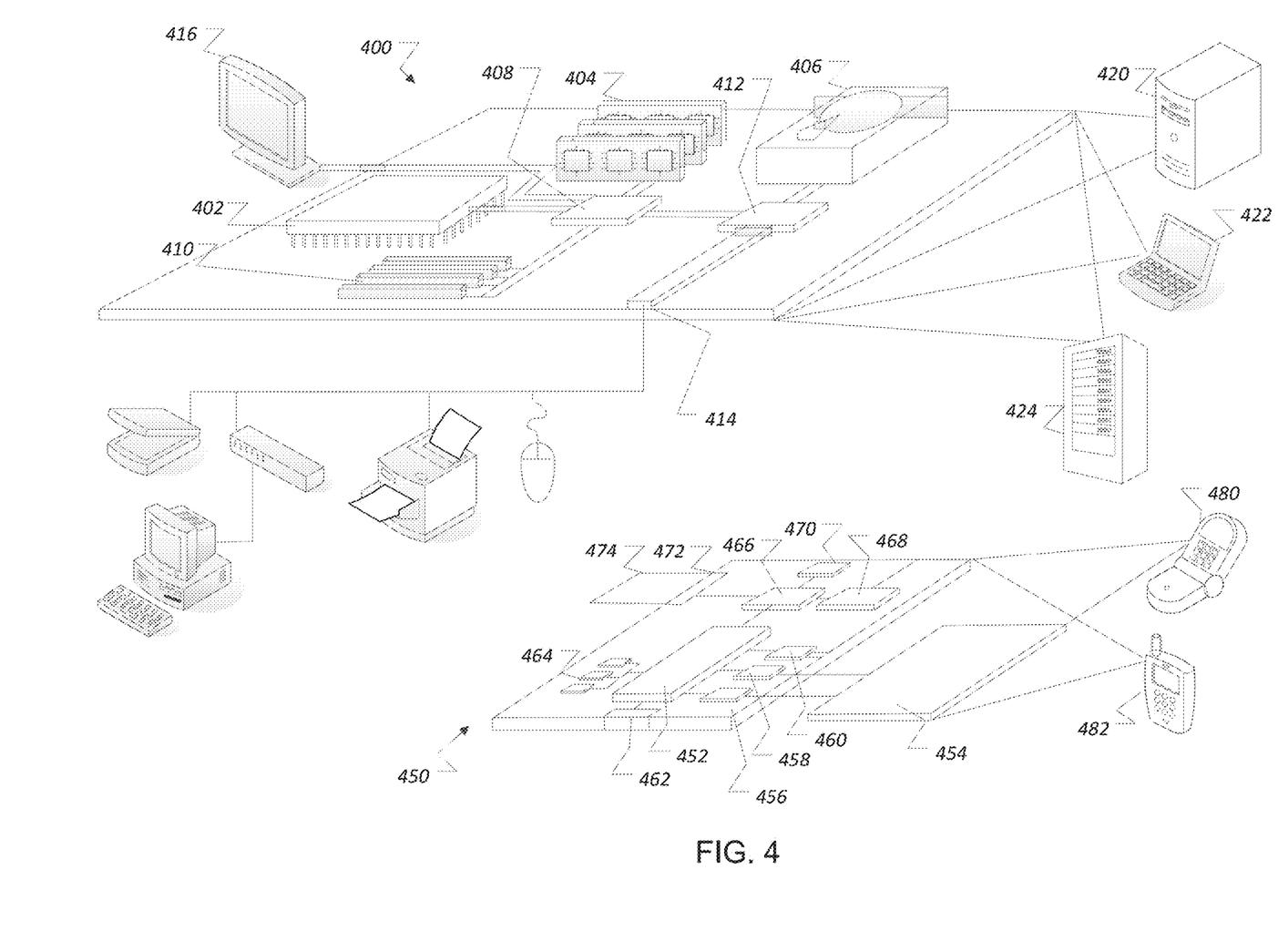
FIG. 4 is a block diagram representing examples of computing devices.

FIG. 4 shows an example of a computing device 400 and a mobile device 450, which may be used with the techniques described here. For example, referring to FIG. 1, the kiosk device 100 can include one or more of the computing device 400 or the mobile device 450, either in part or in its entirety. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, and so forth) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A method for regulating access to a secure system, the method comprising:
    illuminating a first subject with electromagnetic radiation in a first wavelength range that causes first fluorescence in human tissue, wherein the first fluorescence is in a second wavelength range;
    illuminating the first subject with electromagnetic radiation in a third wavelength range that causes second fluorescence in human tissue, wherein the second fluorescence is in a fourth wavelength range, and
        wherein the first wavelength range, the second wavelength range, the third wavelength range, and the fourth wavelength range are each different from one another;
    responsive to illuminating the first subject, receiving, using one or more sensors, electromagnetic radiation emitted from the first subject;
    performing a spectral analysis on the received electromagnetic radiation emitted from the first subject;
    determining, based on the spectral analysis, that the received electromagnetic radiation includes light in the second wavelength range and light in the fourth wavelength range;
    responsive to determining that the received electromagnetic radiation includes light in the second wavelength range and light in the fourth wavelength range, identifying the first subject as a first live person; and
    responsive to identifying the first subject as the first live person, initiating an authentication process for determining whether the first live person is authorized to access the secure system.

2. The method of claim 1, further comprising:
    determining that electromagnetic radiation received from a second subject is outside at least one of the second wavelength range or the fourth wavelength range;
    responsive to determining that the electromagnetic radiation received from the second subject is outside at least one of the second wavelength range or the fourth wavelength range, identifying the second subject as an alternative representation of a live person; and
    responsive to identifying the second subject as the alternative representation of a live person, preventing access to the secure system.

3. The method of claim 1, wherein the first wavelength range includes 360 nm, and wherein the second wavelength range is about 460 nm.

4. The method of claim 3, wherein the third wavelength range includes 405 nm, and wherein the fourth wavelength range is about 500 nm.

5. The method of claim 1, wherein:
    the electromagnetic radiation in the first wavelength range is radiated from one or more first cross-polarized illuminators; and
    electromagnetic radiation emitted from the first subject is received using one or more cross polarizers.

6. The method of claim 5, wherein the electromagnetic radiation in the third wavelength range is radiated from one or more second cross-polarized illuminators, such that a first polarization state of the electromagnetic radiation in the first wavelength range is orthogonal to a second polarization state of the electromagnetic radiation in the third wavelength range.

7. The method of claim 2, wherein the alternative representation of a live person comprises a photograph of a live person.

8. The method of claim 2, wherein the alternative representation of a live person comprises a mask depicting a live person.

9. The method of claim 1, wherein the secure system comprises a user-interface disposed in a kiosk.

10. The method of claim 1, wherein receiving the electromagnetic radiation emitted from the first subject comprises receiving the electromagnetic radiation at the one or more sensors within a predetermined time from an onset of the electromagnetic radiation of the first wavelength range, wherein the predetermined time is an expected time for the human tissue to absorb and reemit incident radiation.

11. A system comprising:
    one or more illumination sources configured to illuminate a first subject with electromagnetic radiation in a first wavelength range that causes first fluorescence in human tissue, and with electromagnetic radiation in a third wavelength range that causes second fluorescence in human tissue,
        wherein the first fluorescence is in a second wavelength range and the second fluorescence is in a fourth wavelength range, and
        wherein the first wavelength range, the second wavelength range, the third wavelength range, and the fourth wavelength range are each different from one another;
    an image acquisition device configured to receive, using one or more sensors and responsive to illuminating the first subject, electromagnetic radiation emitted from the first subject; and
    one or more processing devices configured to perform operations comprising:
        performing a spectral analysis on the received electromagnetic radiation emitted from the first subject,
        determining, based on the spectral analysis, that the received electromagnetic radiation includes light in the second wavelength range and light in the fourth wavelength range,
        responsive to determining that the received electromagnetic radiation includes light in the second wavelength range and light in the fourth wavelength range, identifying the first subject as a first live person, and responsive to identifying the first subject as the first live person, initiating an authentication process for determining whether the first live person is authorized to access a secure system.

12. The system of claim 11, wherein the operations comprise:

determining that electromagnetic radiation received from a second subject is outside at least one of the second wavelength range or the fourth wavelength range;

responsive to determining that the electromagnetic radiation received from the second subject is outside at least one of the second wavelength range or the fourth wavelength range, identifying the second subject as an alternative representation of a live person; and responsive to identifying the second subject as the alternative representation of a live person, preventing access to the secure system.

13. The system of claim 11, wherein the first wavelength range includes 360 nm.

14. The system of claim 13, wherein the second wavelength range is about 460 nm.

15. The system of claim 14, wherein the third wavelength range includes 405 nm.

16. The system of claim 15, wherein the fourth wavelength range is about 500 nm.

17. The system of claim 11, wherein the one or more illumination sources includes one or more polarizers, and the image acquisition device includes one or more corresponding cross polarizers through which the electromagnetic radiation emitted from the first subject is received.

18. The system of claim 12, wherein the alternative representation of a live person comprises a photograph of a live person, or a mask depicting a live person.

19. The system of claim 11, wherein the secure system comprises a user-interface disposed in a kiosk.

20. The system of claim 11, wherein receiving the electromagnetic radiation emitted from the first subject comprises receiving the electromagnetic radiation at the one or more sensors within a predetermined time from an onset of the electromagnetic radiation of the first wavelength range, wherein the predetermined time is an expected time for the human tissue to absorb and reemit incident radiation.

21. One or more non-transitory machine-readable storage devices encoded with instructions that, when executed by one or more processing devices, cause the one or more processing devices to execute operations comprising:

illuminating a first subject with electromagnetic radiation in a first wavelength range that causes first fluorescence in human tissue, wherein the first fluorescence is in a second wavelength range;

illuminating the first subject with electromagnetic radiation in a third wavelength range that causes second fluorescence in human tissue, wherein the second fluorescence is in a fourth wavelength range, and wherein the first wavelength range, the second wavelength range, the third wavelength range, and the fourth wavelength range are each different from one another;

responsive to illuminating the first subject, receiving, using one or more sensors, electromagnetic radiation emitted from the first subject;

performing a spectral analysis on the received electromagnetic radiation emitted from the first subject;

determining, based on the spectral analysis, that the received electromagnetic radiation includes light in the second wavelength range and light in the fourth wavelength range;

responsive to determining that the received electromagnetic radiation includes light in the second wavelength range and light in the fourth wavelength range, identifying the first subject as a first live person; and responsive to identifying the first subject as the first live person, initiating an authentication process for determining whether the first live person is authorized to access a secure system.

* * * * *